US012143457B1

(12) United States Patent
Shevde et al.

(10) Patent No.: US 12,143,457 B1
(45) Date of Patent: Nov. 12, 2024

(54) USAGE-BASED NETWORK CONNECTION MANAGEMENT

(71) Applicant: Google LLC, Mountain View, CA (US)

(72) Inventors: Sumukh Ashok Shevde, San Diego, CA (US); Sudeep Chauhan, Antioch, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/364,220

(22) Filed: Aug. 2, 2023

(51) Int. Cl.
*G06F 15/16* (2006.01)
*H04B 17/318* (2015.01)
*H04L 67/50* (2022.01)
*H04W 36/30* (2009.01)

(52) U.S. Cl.
CPC ......... *H04L 67/535* (2022.05); *H04B 17/318* (2015.01); *H04W 36/305* (2018.08)

(58) Field of Classification Search
CPC ... H04L 67/535; H04B 17/318; H04W 36/305
USPC ........................................................ 709/223
See application file for complete search history.

(56) References Cited

U.S. PATENT DOCUMENTS

| 6,208,718 | B1 * | 3/2001 | Rosenthal | H04M 11/06 379/215.01 |
| 6,317,488 | B1 * | 11/2001 | DePond | H04M 1/80 379/215.01 |
| 8,229,409 | B2 * | 7/2012 | Bluvband | H04M 1/2749 455/414.1 |
| 9,900,228 | B2 * | 2/2018 | Balakrishnan | H04L 43/16 |
| 10,045,181 | B2 * | 8/2018 | Lee | H04W 76/25 |
| 10,511,931 | B1 * | 12/2019 | Khawand | H04B 17/318 |
| 10,542,574 | B1 * | 1/2020 | Jorgovanovic | H04W 4/80 |
| 10,820,369 | B2 * | 10/2020 | Liu | H04B 17/318 |
| 11,599,916 | B2 * | 3/2023 | Doumar | H04L 51/04 |

(Continued)

FOREIGN PATENT DOCUMENTS

| CN | 105681586 A | 6/2016 |
| CN | 109548123 A | 3/2019 |
| CN | 112566089 A | 3/2021 |

OTHER PUBLICATIONS

Apple Inc., "About Bluetooth, Wi-Fi, and cellular on your Apple Watch", https://support.apple.com/en-us/HT204562, Apr. 15, 2022, 3 pp.

(Continued)

*Primary Examiner* — Moustafa M Meky
(74) *Attorney, Agent, or Firm* — Shumaker & Sieffert, P.A.

(57) ABSTRACT

A computing device is described that includes at least one processor, a network interface, and a storage device that stores instructions executable by the at least one processor to obtain a usage profile generated by at least applying a machine learning model to historical feature usage information of the computing device collected while the computing device was wirelessly connected to a companion computing device. The instructions may further cause the one or more processors to determine a timeout value based on the usage profile. The instructions may further cause the one or more processors to initiate a connection to a network using the network interface responsive to determining that the computing device is no longer wirelessly connected to the companion computing device and after an amount of time specified by the timeout value has elapsed.

20 Claims, 6 Drawing Sheets

(56) References Cited

U.S. PATENT DOCUMENTS

| | | | |
|---|---|---|---|
| 2002/0034282 A1* | 3/2002 | Tang | H04M 3/42314 |
| | | | 379/93.28 |
| 2008/0155661 A1* | 6/2008 | Arashin | H04L 63/08 |
| | | | 726/4 |
| 2016/0150350 A1 | 5/2016 | Ingale et al. | |
| 2017/0127472 A1* | 5/2017 | Wang | H04W 76/38 |
| 2017/0353549 A1* | 12/2017 | Passeri | G06F 1/1698 |
| 2018/0098286 A1 | 4/2018 | Gui et al. | |
| 2018/0220482 A1* | 8/2018 | Kuang | H04W 4/80 |
| 2019/0364380 A1* | 11/2019 | Khawand | H04W 4/02 |
| 2021/0224866 A1* | 7/2021 | Doumar | G06Q 30/01 |
| 2021/0234798 A1* | 7/2021 | Sun | H04L 67/04 |
| 2023/0189087 A1* | 6/2023 | Lu | H04W 36/03 |
| | | | 370/331 |
| 2023/0300933 A1* | 9/2023 | Krimstock | H04W 36/03 |
| | | | 370/216 |
| 2024/0007863 A1* | 1/2024 | Fornshell | H04W 12/61 |

OTHER PUBLICATIONS

Apple Inc., "Make phone calls on Apple Watch", https://support.apple.com/en-in/guide/watch/apdc38d7a95e/watchos, Retrieved on, Aug. 2, 2023, 2 pp.

Apple Inc., "Set up cellular on Apple Watch", https://support.apple.com/en-us/HT207578, Oct. 24, 2022, 5 pp.

Apple Inc., "Use your Apple Watch without your iPhone nearby", https://support.apple.com/en-us/HT205547, Sep. 12, 2022, 4 pp.

* cited by examiner

USAGE-BASED NETWORK CONNECTION MANAGEMENT

BACKGROUND

A first computing device may be communicably coupled to a second computing device to access a network. For instance, a wearable computing device may be communicably coupled to a mobile computing device to access a network via the mobile computing device connection to the network. In instances when the first computing device is communicably decoupled from the second computing device, the first computing device may use a modem data channel connection to connect to the network.

SUMMARY

The techniques described herein enable a computing device to dynamically adjust activation of one or more network interfaces. The computing device may be registered or otherwise managed by a user associated with a companion computing device. In such instances, the computing device may initialize or activate one or more network interfaces responsive to no longer being communicatively coupled to the companion computing device. The techniques described herein may enable the computing device to dynamically adjust activation of the one or more network interfaces based on usage patterns of a user associated with the computing device and the companion computing device.

The computing device may be a wearable computing device communicably coupled to a companion computing device. The wearable computing device, companion computing device, or an external computing system, with explicit consent from the user associated with the wearable computing device and the companion device, may maintain historical usage information for the user and train a machine learning model based on this historical usage information. The trained machine learning model may take various context and usage information as input parameters and output a recommended timeout value. The wearable computing device may use the recommended timeout value output by the machine learning model to configure an amount of time to elapse before the wearable computing device will activate one or more network interfaces responsive to the wearable computing device disconnecting from the companion computing device. The machine learning model may continually output a recommended timeout value based on additional usage information for the user. The wearable computing device may receive instructions to adjust the timeout value based on subsequent outputs from the machine learning model. In this way, techniques of this disclosure may reduce the power consumed by activating various network interfaces of the wearable computing device while also reducing the likelihood of the user missing phone calls or other network-dependent activity.

In one example, a method includes obtaining, by a first computing device, a usage profile generated by at least applying a machine learning model to historical feature usage information of the first computing device collected while the first computing device was wirelessly connected to a second computing device. The method may further include determining, by the first computing device and based on the usage profile, a timeout value. The method may further include responsive to determining, by the first computing device, that the first computing device is no longer wirelessly connected to the second computing device and after an amount of time specified by the timeout value has elapsed, initiating, by the first computing device, a modem connection to a network.

In another example, a computing device includes at least one processor, a network interface, and a storage device that stores instructions executable by the at least one processor to obtain a usage profile generated by at least applying a machine learning model to historical feature usage information of the computing device collected while the computing device was wirelessly connected to a companion computing device. The instructions may further cause the one or more processors to determine a timeout value based on the usage profile. The instructions may further cause the one or more processors to initiate a connection to a network using the network interface responsive to determining that the computing device is no longer wirelessly connected to the companion computing device and after an amount of time specified by the timeout value has elapsed.

In another example, a computer-readable storage medium storing instructions that, when executed, cause at least one processor of a first computing device to obtain a usage profile generated by at least applying a machine learning model to historical feature usage information of the first computing device collected while the first computing device was wirelessly connected to a second computing device. The instructions may further cause the at least one processor of the first computing device to determine, based on the usage profile, a timeout value. The instructions may further cause at least one processor of the first computing device to initiate a modem connection to a network responsive to determining that the first computing device is no longer wirelessly connected to the second computing device and after an amount of time specified by the timeout value has elapsed.

The details of one or more examples of the disclosure are set forth in the accompanying drawings and the description below. Other features, objects, and advantages will be apparent from the description and drawings, and from the claims.

DETAILED DESCRIPTION

Figure 1:
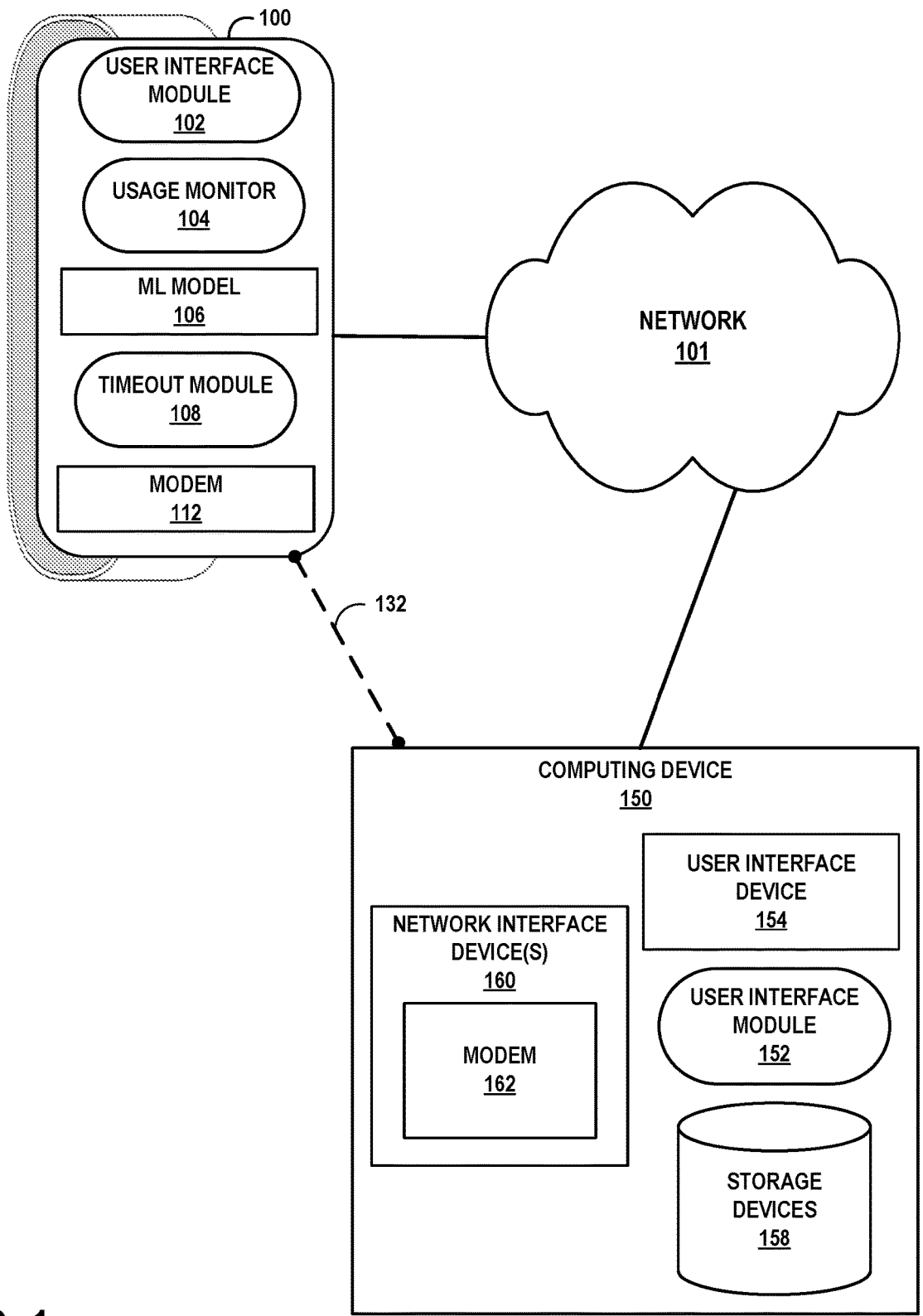
FIG. 1 is a conceptual diagram illustrating an example computing system for determining when to activate a modem of a wearable computing device, in accordance with one or more aspects of the present disclosure.

FIG. 1 is a conceptual diagram illustrating an example computing device for determining when to activate a modem of a wearable computing device, in accordance with one or more aspects of the present disclosure. As shown in the example of FIG. 1, computing device 100 may be a mobile computing device, such as a mobile phone (including a smartphone), a laptop computer, a tablet computer, a wearable computing device, or any other computing device that can connect to network 101 via a network interface, such as cellular data network modem. In some examples, computing device 100 may be a wearable computing device such as a computerized watch, a computerized fitness band/tracker, computerized eyewear, computerized headwear, a computerized glove, or any other type of mobile computing device that can attach to or be worn on a person's body or clothing.

In the example of FIG. 1, computing device 100 includes user interface (UI) module 102, usage monitor 104, machine learning model 106, timeout module 108, and modem 112. UI module 102 may perform operations described herein using hardware, software, firmware, or a mixture thereof residing in and/or executing at computing device 100. Computing device 100 may execute UI module 102 with one processor or with multiple processors. In some examples, computing device 100 may execute UI module 102 as a virtual machine executing on underlying hardware. UI module 102 may execute as one or more services of an operating system or computing platform or may execute as one or more executable programs at an application layer of a computing platform.

UI module 102, as shown in the example of FIG. 1, may be operable by computing device 100 to perform one or more functions, such as receive input and send indications of such input to other components associated with computing device 100. UI module 102 may also receive data from components associated with computing device 100. Using the data received, UI module 102 may cause other components associated with computing device 100 to provide output based on the data.

Modem 112 may be a network interface device that enables computing device 100 to connect to, or otherwise exchange data with, network 101. Modem 112 may be, for example, a cellular modem, digital subscriber line (DSL) modem, cable modem, satellite modem, wireless modem, or any other modem that can activate a channel connection (e.g., data channel, voice channel, dedicated channel, etc.) to network 101.

In some instances, modem 112 may be a network interface device communicably coupled to computing device 100 with a wired connection (e.g., universal serial bus, Ethernet®, etc.) or wireless connection (e.g., a communication processor of computing device 100 connected to a router of modem 112). In such instances, timeout module 108 may send instructions to an external modem 112—via the wired or wireless connection—to activate a network interface (e.g., modem 112 data channel connection to network 101) after the timeout value has elapsed. Responsive to external modem 112 activating the network interface, external modem 112 may enable computing device 100 to communicate with network 101 via the wired or wireless connection.

While illustrated as internal to computing device 100, usage monitor 104, machine learning model 106, timeout module 108, and modem 112 may be external to computing device 100. In some instances, multiple devices (e.g., computing device 100, computing device 150, and/or any other computing device or computing system) may perform a portion of the functionality associated with usage monitor 104, machine learning model 106, timeout module 108, and modem 112, as described herein. For example, usage monitor 104, machine learning model 106, and timeout module 108 may execute on computing device 150 or another computing device or computing system. Computing device 150 or a computing system may perform the operations as described above with respect to usage monitor 104, machine learning model 106, and timeout module 108. In response to computing device 150 or the computing system generating a usage profile and determining a timeout value based on the usage profile, computing device 150 or the computing system may send instructions to computing device 100 to initiate modem 112 connection to network 101 (e.g., a data channel connect, a voice channel connection, etc.) when the timeout value has elapsed and computing device 100 is not connected to computing device 150 via personal area network 132.

Computing device 150, in the example of FIG. 1, includes user interface device 154 (also referred to herein as, "UI device 154"), user interface module 152, storage devices 158, and network interface devices 160. UI device 154 of computing device 150 may be configured to function as an input device and/or an output device for computing device 150. UI device 154 may be implemented using various technologies. For instance, UI device 154 may be configured to receive input from a user through tactile, audio, and/or video feedback. Examples of UI device 154 may include, but are not limited to, a presence-sensitive display, a presence-sensitive or touch-sensitive input device, a mouse, a keyboard, a voice responsive system, video camera, microphone or any other type of device for detecting a command from a user. In some examples, UI device 154 may include a touch-sensitive or presence-sensitive input screen, such as a resistive touchscreen, a surface acoustic wave touchscreen, a capacitive touchscreen, a projective capacitive touchscreen, a pressure sensitive screen, an acoustic pulse recognition touchscreen, or another presence-sensitive technology. That is, UI device 154 of computing device 150 may include a presence-sensitive device that may receive tactile input from a user of computing device 150. UI device 154 may receive indications of the tactile input by detecting one or more gestures from the user (e.g., when the user touches or points to one or more locations of UI device 154 with a finger or a stylus pen).

UI device 154 may additionally or alternatively be configured to function as an output device by providing output to a user using tactile, audio, or video stimuli. Examples of output devices include a sound card, a video graphics adapter card, or any of one or more display devices, such as a liquid crystal display (LCD), dot matrix display, light emitting diode (LED) display, miniLED, microLED, organic light-emitting diode (OLED) display, e-ink, or similar monochrome or color display capable of outputting visible information to a user of computing device 150. Additional examples of UI device 154 may include, but are not limited to, a speaker, a haptic device, or other device that can generate intelligible output to a user. For instance, UI device 154 may present output to a user of computing device 150 as a graphical user interface that may be associated with functionality provided by computing device 150. In this way, UI device 154 may present various user interfaces of applications executing at or accessible by computing device 150 (e.g., an electronic message application, an Internet browser application, etc.). A user of computing device 150 may interact with a respective user interface of an application to cause computing device 150 to perform operations relating to a function.

In some examples, UI device 154 of computing device 150 may detect two-dimensional and/or three-dimensional gestures as input from a user of computing device 150. For instance, a sensor of UI device 154 may detect the user's movement (e.g., moving a hand, an arm, a pen, a stylus, etc.) within a threshold distance of the sensor of UI device 154. UI device 154 may determine a two- or three-dimensional vector representation of the movement and correlate the vector representation to a gesture input (e.g., a hand-wave, a pinch, a clap, a pen stroke, etc.) that has multiple dimensions. In other words, UI device 154 may, in some examples, detect a multidimensional gesture without requiring the user to gesture at or near a screen or surface at which UI device 154 outputs information for display. Instead, UI device 154 may detect a multi-dimensional gesture performed at or near a sensor which may or may not be located near the screen or surface at which UI device 154 outputs information for display.

In the example of FIG. 1, computing device 150 includes user interface (UI) module 152. UI module 152 may perform operations described herein using hardware, software, firmware, or a mixture thereof residing in and/or executing at computing device 150. Although illustrated as internal to computing device 150 network interface devices 160, user interface device 154, user interface module 152, and/or storage devices 158 may be external to computing device 150.

Computing device 150 may execute UI module 152 with one processor or with multiple processors. In some examples, computing device 150 may execute UI module 152 as a virtual machine executing on underlying hardware. UI module 152 may execute as one or more services of an operating system or computing platform or may execute as one or more executable programs at an application layer of a computing platform.

UI module 152, as shown in the example of FIG. 1, may be operable by computing device 150 to perform one or more functions, such as receive input and send indications of such input to other components associated with computing device 150. UI module 152 may also receive data from components associated with computing device 150. Using the data received, UI module 152 may cause other components associated with computing device 150, such as UI device 154, to provide output based on the data.

Storage devices 158 of computing device 150 may store information for processing during operation of computing device 100 and/or computing device 150 (e.g., computing device 100 may send usage information data collected by usage monitor 104 to computing device 150 via personal area network 132 and computing device 150 may store the received usage information in storage devices 158). In some examples, storage devices 158 may be a temporary memory, meaning that a primary purpose of storage devices 158 is not long-term storage. Storage devices 158 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 158 may include one or more computer-readable storage media. Storage devices 158 may be configured to store larger amounts of information than volatile memory. Storage devices 158 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage devices 158 may store program instructions and/or information associated with modules of both computing device 100 and computing device 150.

Network interface devices 160 of computing device 150 may include modem 162, in the example of FIG. 1. Modem 162 may be a network interface device that enables computing device 150 to connect to, or otherwise exchange data with, network 101. Modem 162 may be, for example, a cellular modem, digital subscriber line (DSL) modem, cable modem, satellite modem, wireless modem, or any other modem that can activate a channel connection (e.g., data channel, voice channel, dedicated channel, etc.) to network 101.

In the example of FIG. 1, computing device 100 may be wirelessly connected to computing device 150 via personal area network 132 (e.g., near-field communication (NFC), Bluetooth® or different profiles thereof, e.g., Bluetooth® low energy (BLE), WIFI Direct, etc.). Computing device 150 may be a mobile computing device, such as a mobile phone (including a smartphone), a laptop computer, a tablet computer, a wearable computing device, or any other computing device with appropriate credentials to be communicatively coupled to computing device 100.

Computing device 100 and computing device 150 may be operated by the same user. For example, computing device 100 may be a wearable computing device initiated with the same user information (user account information, cellular subscriber identity, etc.) as computing device 150. Computing device 100 may have the capability to connect to network 101 with a network interface device (e.g., modem 112 channel connections). Computing device 100 may deactivate one or more channels of a network interface device connection to network 101 while wirelessly connected to computing device 150 via personal area network 132. Computing device 100 may use personal area network 132 to connect to network 101 via network interface devices 160 of computing device 150 (e.g., modem 162). Computing device 100 may also use personal area network 132 to make and/or receive voice calls or messages for a user operating both computing device 100 and computing device 150. In some instances, computing device 100 may be communicably coupled to computing device 150 via a local area network (e.g., Wireless Fidelity®). Computing device 100 may also connect to network 101 via the local area network.

Network 101 may include any public or private communication network, such as a cellular network, Wi-Fi network, or other type of network for transmitting data between computing devices. In some examples, network 101 may represent one or more packet switched networks, such as the Internet. Computing device 100 and/or computing device 150, for example, may send and receive data across network 101 using any suitable communication techniques. For example, computing device 100 may be operatively coupled to network 101 using respective network links. Network 101 may include network hubs, network switches, network routers, terrestrial and/or satellite cellular networks, etc., that are operatively inter-coupled thereby providing for the exchange of information between computing device 100 and another computing device or computing system. In some examples, network links of network 101 may include Ethernet, ATM or other network connections. Such connections may include wireless and/or wired connections.

The techniques described herein may dynamically manage data transmission functionality of network devices, such as cellular modems. The techniques described herein may adjust timeout values associated with computing device 100 activating a modem data channel connection in response to disconnecting from computing device 150. For example, computing device 100 may be a data-enabled wearable computing device, such as a smart watch, that wirelessly connects to computing device 150, such as a mobile phone, via a personal area network. While connected to computing device 150, the computing device 100 may power off or otherwise deactivate one or more network interfaces, such as a cellular data network modem. If computing device 100 disconnects from computing device 150, computing device 100 may automatically power on or otherwise activate one or more of the previously deactivated network interfaces. However, activating such network interfaces may consume a significant amount of power and, given the usage patterns of a user of the computing device 100, may not be necessary.

Rather than automatically activating the network interface as soon as computing device 100 disconnects from computing device 150 (which may unnecessarily consume power), or after a static preconfigured period of time (which may result in missed calls or other activity), techniques of this disclosure enable computing device 100 to dynamically adjust when computing device 100 activates the one or more network interfaces based on usage patterns of the user of computing device 100.

In accordance with techniques of this disclosure, computing device 100 may intelligently regulate power consumption associated with initializing functionality of modem 112 (e.g., data transmission functionality, voice call functionality, etc.). In the example of FIG. 1, computing device 100 and computing device 150 may be owned and/or operated by the same user. Computing device 100 and computing device 150 may allow the user to make or receive phone calls, send or receive messages, or other actions that may require a network interface device of either computing device 100 (e.g., modem 112) or computing device 150 (e.g., modem 162). Computing device 100 and/or computing device 150 request explicit user consent from a user associated with computing device 100 and computing device 150 to monitor and/or store usage information related to actions that may require a network interface device of either computing device 100 or computing device 150. Computing device 100 and/or computing device 150 may output the request for user consent with user interface module 102 or user interface module 152, respectively. User interface module 102 and/or user interface module 152 may detect a signal input by a user indicating the user authorizes computing device 100 and/or computing device 150 to store usage information associated with actions that may require a network interface device of computing device 100 and/or computing device 150. In response to receiving explicit authorization from the user of computing device 100 and computing device 150, computing device 100 and/or computing device 150 may store the usage information in storage devices 158 of computing device 150 or a data repository managed by a remote computing system. Absent such explicit authorization from the user, computing device 100 and computing device 150 do not store the usage information in storage devices 158 or in the data repository of the remote computing system.

In situations in which the computing device 100 discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

In the example of FIG. 1, usage monitor 104 of computing device 100 may obtain features including historical feature usage information related to behavior of a user operating computing device 100. Usage monitor 104 may obtain, responsive to receiving explicit user consent, usage information associated with actions that may require a network interface device of computing device 100 and/or computing device 150. Usage monitor 104 may only obtain features after receiving explicit consent from a user operating computing device 100. In some instances, usage monitor 104 may obtain features by monitoring a user's interaction with a user interface managed by user interface module 102 or by monitoring a signal strength of personal area network 132. Usage monitor 104 may obtain features that include historical feature usage information of computing device 100. In some instances, usage monitor 104 may obtain features based on historical feature usage information of computing device 100 collected while computing device 100 is wirelessly connected to computing device 150 via personal area network 132.

In some examples, usage monitor 104 may obtain historical feature usage information such as a frequency computing device 100 or computing device 150 uses a network interface device (e.g., voice channel of a connection between modem 112 and network 101). For example, usage monitor 104 may collect data of how often and/or what time of day a user operating computing device 100 or computing device 150 uses a network interface device. In some instances, usage monitor 104 may include availability of a user operating computing device 100 based on a schedule of the user. For example, usage monitor 104 may gain access to a calendar of a user operating computing device 100, with the explicit consent of a user operating computing device 100. In some instances, usage monitor 104 may include a received signal strength indication (RRSI) of computing device 100 connected to computing device 150 over personal area network 132. Usage monitor 104 may store, with explicit user consent, the usage information in one or more storage devices or a data repository managed by a remote computing system.

Usage monitor 104 may provide the obtained usage information to machine learning model 106 to generate a usage profile. Usage monitor 104 may only provide the obtained usage information to machine learning model 106 responsive to computing device 100 receiving explicit consent from a user operating computing device 100. In some instances, usage monitor 104 may fetch the usage information from one or more storage devices or data repositories managed by a remote computing system. After receiving explicit user consent, usage monitor 104 may input one or more features specified in the usage information to machine learning model 106.

Machine learning model 106 may generate a usage profile that correlates to the behavior of computing device 100 and/or computing device 150 over time. For example, machine learning model 106 may generate a usage profile correlating to a frequency and/or time of day computing device 100 or computing device 150 uses a network interface device (e.g., receives or makes voice calls via a voice channel connection between modem 112 and network 101). In some examples, machine learning model 106 may generate a usage profile correlating to an availability of a user operating computing device 100. In some examples, machine learning model 106 may generate a usage profile that also correlates to a signal strength of personal area network 132 over time. Machine learning model 106 may also generate a usage profile correlating to any combination of frequency and/or time of day computing device 100 or computing device 150 uses a network interface device, an availability of a user operating computing device 100, or a signal strength of personal area network 132 over time. Machine learning model 106 may only generate a usage profile responsive to receiving explicit consent of a user operating computing device 100.

In the example of FIG. 1, computing device 100 may generate the usage profile by at least applying machine learning model 106 to features obtained by usage monitor 104 of computing device 100. Machine learning model 106 may be a machine learning system or other type of predictive or artificial intelligence type model. Further details of machine learning model 106 are described in FIGS. 4A-4C, as well as throughout the specification.

In some instances, computing device 100, and more specifically timeout module 108, may determine one or more customized timeout values based on the usage profile generated by machine learning module 106. For example, timeout module 108 may determine a timeout value of one or more days based on a usage profile indicating a user rarely activates a network interface (e.g., a modem 112 voice channel) of computing device 100 or computing device 150. In other examples, timeout module 108 may determine a timeout value of a few seconds based on a usage profile indicating a user often activates a network interface of computing device 100 or computing device 150. Timeout module 108 may only determine a timeout value based on the usage profile responsive to receiving explicit user consent from a user operating computing device 100.

In some instances, timeout module 108 of computing device 100 may use the usage profile to determine, with express user consent, a customized timeout value associated with one or more dates or days of the week. For example, timeout module 108 may determine a timeout value for Saturday and Sunday that extends until Monday morning based on a usage profile indicating actions involving modem 112 are rare on the weekend. In other words, computing device 100 may not activate a network interface (e.g., modem 112 data channel connection) responsive to computing device 100 disconnecting from computing device 150 on Saturday or Sunday until Monday morning. In another example, timeout module 108 may determine a timeout value based on a usage profile indicating a user operating computing device 100 is on vacation or does not want to be disturbed. In this example, timeout module 108 may set the timeout value to extend to a time the user returns from said vacation or is otherwise available. In other examples, timeout module 108 may determine a timeout value based on a usage profile indicating voice call meetings involving a user operating computing device 100. In such examples, timeout module 108 may determine the timeout value is zero seconds during, or a few minutes before, said voice call meetings. Timeout module 108 may set the timeout value to zero seconds to not interrupt a user's experience while operating computing device 100.

Computing device 100 may use timeout module 108 to apply, with express user consent, the timeout value generated based on the usage profile generated by machine learning model 106. Timeout module 108 may determine a timeout value that specifies an amount of time computing device 100 activates a network interface (e.g., modem 112 data channel connection to network 101). Timeout module 108 may store the timeout value as instructions for computing device 100 to activate a network interface (e.g., modem 112 data channel connection) after the timeout value elapses responsive to computing device 100 disconnecting from computing device 150. Timeout module 108 may monitor the status of personal area network 132 connection between computing device 100 and computing device 150. In the example of FIG. 1, timeout module 108 may start a timer according to the timeout value responsive to computing device 100 disconnecting from personal area network 132 connection to computing device 150. In response to timeout module 108 determining the timeout value has elapsed and computing device 100 connection to computing device 150 via personal area network 132 has not been restored, timeout module 108 may send instructions to modem 112 to activate a data channel connection with network 101. In response to timeout module 108 determining the timeout value has not elapsed and the connection between computing device 100 and computing device 150 via personal area network 132 has been restored, timeout module 108 may discard the current timer and continue to monitor for future instances of computing device 100 disconnecting from computing device 150. In some instances, timeout module 108 may discard a timer started after computing device 100 disconnects from computing device 150 responsive to computing device 100 connecting to network 101 via a local area network (e.g., WiFi®).

In some examples, usage monitor 104 may receive feedback from a user operating computing device 100. Usage monitor 104 may, with explicit user consent, receive feedback from the user to update or improve the timeout value generated by timeout module 108. For example, while the timer initiated by timeout module 108 is active, user interface module 102 may receive a signal from the user indicating data transmission functionality of modem 112 is needed. User interface module 102 may also output a request for consent to the user to use the manual initiation of modem 112 (e.g., data transmission functionality, voice call functionality, etc.) to update or improve the timeout value generated by timeout module 108. In response to receiving explicit user consent, user interface module 102 may send indications of manual initiation of the functionality of modem 112 to usage monitor 104. Usage monitor 104 may provide the indications of manual initiations of the functionality of modem 112 to machine learning model 106. Usage monitor 104 may provide such indications to machine learning model 106 to update or improve the usage profile generated by machine learning model 106. Timeout module 108 may update the timeout value based on the updated usage profile machine learning model 106 output after receiving the feedback from the user.

The techniques described herein may improve the battery life of computing device 100 by saving processor power usage associated with initiating modem 112 connection to network 101. Computing device 100 initiating modem 112 connection to network 101 may consume more than one percent of battery life of computing device 100, which may be a significant amount when aggregating the number of times computing device 100 may initiate modem 112 connection to network 101 (e.g., data channel connection, voice channel connection, etc.). Additionally, computing device 100 may reconnect to computing device 150 shortly after computing device 100 initiates a connection to network 101 using modem 112, thereby unnecessarily consuming processing power. The techniques described herein may generate a usage profile to avoid computing device 100 unnecessarily consuming processing power associated with initiating modem 112 connection to network 101. In response to computing device 100 waiting to initiate modem 112 connection to network 101 until a timeout value has expired or connection to computing device 150 has been reestablished, computing device 100 may not unnecessarily consume energy. In addition, computing device 100 establishing the timeout value based on a usage profile avoids interrupting the experience of a user operating computing device 100. The techniques described herein adjust an amount of time computing device 100 will wait to initiate modem 112 connection to network 101 according to a usage profile identifying whether initiating modem 112 connection to network 101 is necessary. In this way, the techniques may significantly improve battery life of computing device 100 while accommodating for a user's normal operation of computing device 100.

Figure 2:
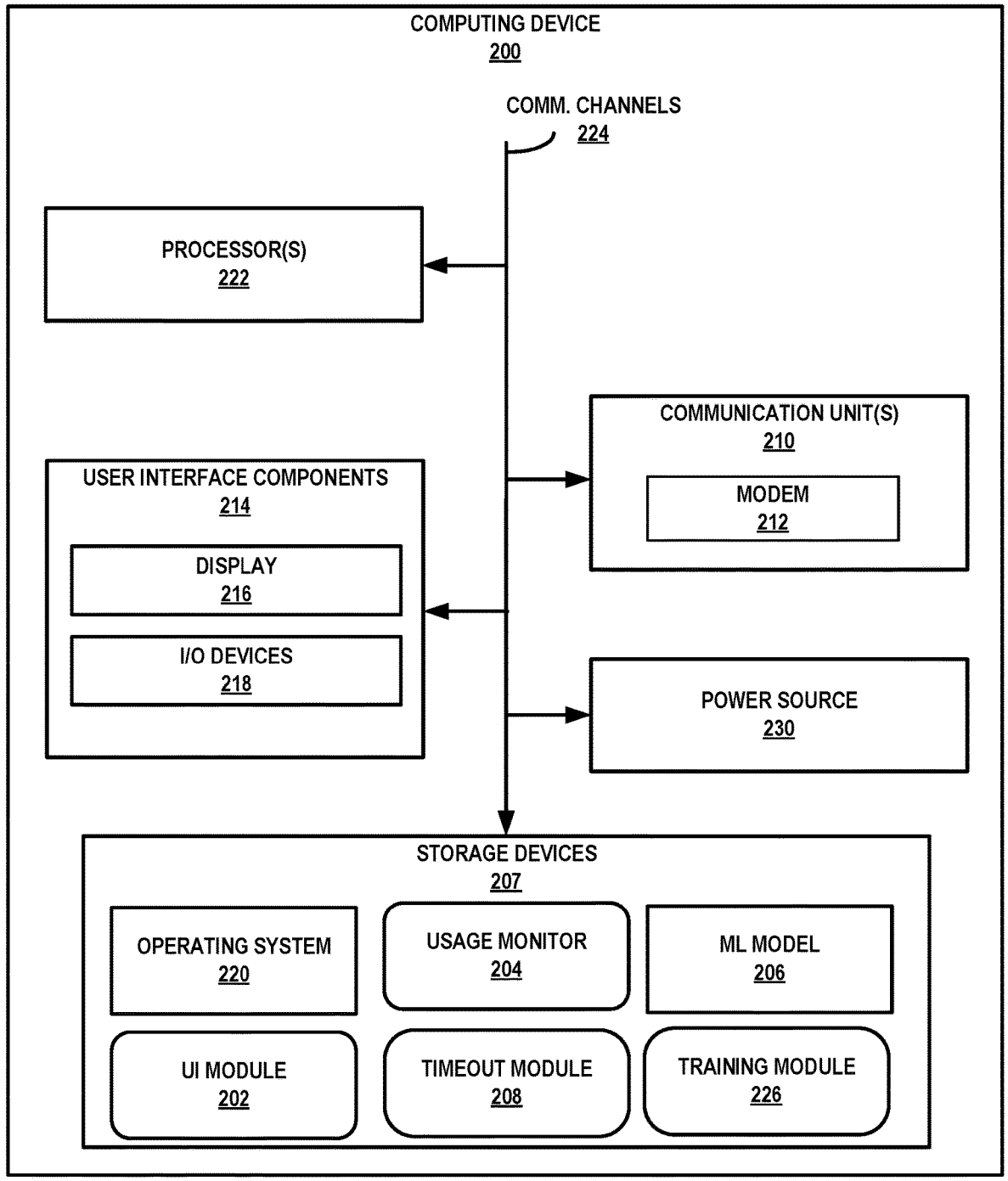
FIG. 2 is a block diagram illustrating an example computing device for determining when to activate a modem of the computing device, in accordance with one or more aspects of the present disclosure.

FIG. 2 is a block diagram illustrating an example computing device 200 for determining when to activate a modem of computing device 200, in accordance with one or more aspects of the present disclosure. Computing device 200 may be one example of computing device 100 of FIG. 1, in accordance with one or more techniques of this disclosure. FIG. 2 illustrates only one particular example of computing device 200, and many other examples of computing device 200 may be used in other instances and may include a subset of components included in example computing device 200 or may include additional components not shown in FIG. 2.

As shown in FIG. 2, computing device 200 may include one or more user interface components 214 ("UI components 214"), one or more processors 222 ("processors 222"), one or more storage devices 207 ("storage devices 207"), one or more communication units 210 ("communication unit 210"), and power source 230. Also shown in FIG. 2, UI components 214 may include display 216 and one or more input/output devices 218 ("I/O devices 218"). As also shown in FIG. 2, storage devices 207 may include a user interface module 202 ("UI module 202"), usage monitor 204, machine learning model 206 ("ML model 206"), timeout module 208, training module 226, and operating system 220 ("OS 220").

In some examples, UI components 214 may include display 216 and input/output devices 218 ("I/O devices 218"). Display 216 may be a presence-sensitive display configured to detect input (e.g., touch and non-touch input) from a user of respective computing device 200. UI components 214 may output information to a user in the form of a UI, which may be associated with functionality provided by computing device 200. Such UIs may be associated with computing platforms, operating systems, applications, and/or services executing at or accessible from computing device 200 (e.g., electronic message applications, chat applications, Internet browser applications, mobile or desktop operating systems, social media applications, electronic games, menus, and other types of applications).

UI components 214 may include I/O devices 218. I/O devices 218 of computing device 200 may receive input. Examples of input are tactile, audio, and video input. I/O devices 218 of computing device 200, in one example, includes a presence-sensitive display, a fingerprint sensor, touch-sensitive screen, mouse, keyboard, voice responsive system, video camera, microphone or any other type of device for detecting input from a human or machine.

I/O devices 218 may include one or more sensors. Numerous examples of sensors exist and include any input component configured to obtain environmental information about the circumstances surrounding computing device 200 and/or physiological information that defines the activity state and/or physical well-being of a user of computing device 200. In some examples, a sensor may be an input component that obtains physical position, movement, and/or location information of computing device 200. For instance, sensors may include one or more location sensors (e.g., GNSS components, Wi-Fi components, cellular components), one or more temperature sensors, one or more motion sensors (e.g., multi-axial accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

I/O devices 218 of computing device 200 may generate one or more outputs. Examples of outputs are tactile, audio, and video output. I/O devices 218 of computing device 200, in one example, includes a presence-sensitive display, sound card, video graphics adapter card, speaker, liquid crystal display (LCD), or any other type of device for generating output to a human or machine.

Processors 222 may implement functionality and/or execute instructions within computing device 200. For example, processors 222 may receive and execute instructions that provide the functionality of usage monitor 204, machine learning model 206, UI module 202, timeout module 208, training module 226, and OS 220. These instructions executed by processors 222 may cause computing device 200 to store and/or modify information within storage devices 207 or processors 222 during program execution. Processors 222 may execute instructions of usage monitor 204, machine learning model 206, UI module 202, timeout module 208, training module 226, and OS 220 to perform one or more operations. That is usage monitor 204, machine learning model 206, UI module 202, timeout module 208, training module 226, and OS 220 may be operable by processors 222 to perform various functions described herein.

Storage devices 207 within computing device 200 may store information for processing during operation of computing device 200 (e.g., computing device 200 may store data accessed by usage monitor 204, machine learning model 206, UI module 202, timeout module 208, training module 226, and OS 220 during execution at computing device 200). In some examples, storage devices 207 may include temporary memory, meaning that a primary purpose of storage devices 207 is not long-term storage. Storage devices 207 on computing device 200 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 207 may include one or more computer-readable storage media. Storage devices 207 may be configured to store larger amounts of information than volatile memory. Storage devices 207 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 207 may store program instructions and/or information associated with usage monitor 204, machine learning model 206, UI module 202, timeout module 208, training module 226, and OS 220.

Communication units 210 of computing device 200 may communicate with one or more external devices via one or more wired and/or wireless networks by transmitting and/or receiving network signals on the one or more networks. Examples of communication units 210 may include a network interface card (e.g., such as an Ethernet card), an optical transceiver, a radio frequency transceiver, a GNSS receiver, or any other type of device that can send and/or receive information. Other examples of communication units 210 may include short wave radios, cellular data radios (for terrestrial and/or satellite cellular networks), wireless network radios, as well as universal serial bus (USB) controllers.

In the example of FIG. 2, communication units 210 may include modem 212. Modem 212 may be an example of modem 112 as described in FIG. 1. Modem 212 may be a network interface device that enables computing device 200 to connect to, or otherwise exchange data with, a network (e.g., network 110 of FIG. 1). Modem 212 may be, for example, a cellular modem, digital subscriber line (DSL) modem, cable modem, satellite modem, wireless modem, or any other modem that can activate a channel connection (e.g., data channel, voice channel, control channel, dedicated channel, etc.) to the network. While illustrated as internal to computing device 200, modem 212 may be external to computing device 200. For example, modem 212 may be a network interface device communicably coupled to computing device 200 with a wired connection (e.g., universal serial bus, Ethernet®, etc.) or wireless connection (e.g., a communication processor of computing device 200 connected to a router of modem 212).

Communication channels 224 ("COMM channel 224") may interconnect each of the components 207, 210, 214, and 222 for inter-component communications (physically, communicatively, and/or operatively). In some examples, communication channel 224 may include a system bus, a network connection, an inter-process communication data structure, or any other method for communicating data.

Computing device 200 may include OS 220. OS 220 may control the operation of components of computing device 200. For example, OS 220 may facilitate the communication of usage monitor 204, machine learning model 206, UI module 202, timeout module 208, and training module 226 with processors 222, storage devices 207, and communication units 210. In some examples, OS 220 may manage interactions between software applications and a user of computing device 200. OS 220 may have a kernel that facilitates interactions with underlying hardware of computing device 200 and provides a fully formed application space capable of executing a wide variety of software applications having secure partitions in which each of the software applications executes to perform various operations. In some examples, UI module 202 may be considered a component of OS 220.

Power source 230 may provide power to one or more components of computing device 200. In some examples, power source 230 may be a battery. Power source 230 may provide power to components 222, 210, 214, and 207 of computing device 200, for example. Examples of power source 230 may include, but are not necessarily limited to, batteries having zinc-carbon, lead-acid, nickel cadmium (NiCd), nickel metal hydride (NiMH), lithium ion (Li-ion), and/or lithium polymer (Lipo) chemistries. In some examples, power source 230 may have a limited capacity (e.g., 1000-3000 mAh).

In the example of FIG. 2, computing device 200 may intelligently regulate power consumption associated with initializing functionality of modem 212. Computing device 200 may output a request for explicit consent with UI module 202 to monitor, store, and/or analyze behavior of a user operating computing device 200. Responsive to UI module 202 receiving explicit consent from the user to monitor, store, and analyze behavior of a user operating computing device 200, usage monitor 204 of computing device 200 may collect usage information associated with behavior of a user operating computing device 200. Usage monitor 204 may monitor and obtain usage information such as historical feature usage information related to the behavior of the user operating computing device 200. Usage monitor 204 may obtain, responsive to receiving explicit user consent, usage information associated with actions that may require communication units 210 (e.g., modem 212).

Usage monitor 204 may provide the obtained usage input to machine learning model 206 to generate a usage profile. Usage monitor 204 may only provide the obtained usage information to machine learning model 206 responsive to computing device 200 receiving explicit consent from a user operating computing device 200. Machine learning model 206 may be a machine learning system or other type of predictive or artificial intelligence type model. Machine learning model 206 may output a usage profile that correlates to the behavior of a user operating computing device 200. For example, machine learning model 206 may generate a usage profile correlating to a frequency and/or time of day computing device 200 uses modem 212 (e.g., receives or makes voice calls via a channel connection between modem 223 and a network).

Training module 226 may train machine learning model 206 to generate a usage profile based on obtained usage information. For example, training module 226 may include synthetic data of usage information and a target usage profile used to train machine learning model 206. Training module 226 may train machine learning model 206 based on the synthetic usage information to generate usage profile candidates. Training module 226 may instruct machine learning model 206 to output a usage profile candidate that is similar to the target usage profile. Training module 226 may iteratively train machine learning model 206 based on multiple sets of synthetic usage information and corresponding target usage profiles. In some examples, training module 226 may receive an input from a user operating computing device 200 indicating that the timeout value associated with the usage profile is inaccurate according to the needs of the user operating computing device 200. Training module 226 may use the user feedback to further train and improve usage profiles output by machine learning model 206.

Although illustrated in the example of FIG. 2 as internal to computing device 200, machine learning model 206 and training module 226 may be external to computing device 200. For example, training module 226 and machine learning model 206 may execute on an external computing device (e.g., computing device 150 of FIG. 1) or an external computing system. Computing device 200 may send, responsive to receiving explicit user consent, the usage information collected by usage monitor 204 to the external computing device or computing system hosting machine learning model 206 with communication units 210. Computing device 200 may receive a usage profile generated by machine learning model 206 with communication units 210.

Computing device 200, or more specifically timeout module 208, may determine one or more customized timeout values based on the usage profile generated by machine learning model 206. Timeout module 208 may determine a timeout value that specifies an amount of time the data transmission functionality of modem 212 remains inactive in response to computing device 200 no longer being wirelessly coupled to a computing device or router that previously provided computing device 200 with data transmission functionality. For example, computing device 200 may have data transmission functionality while wirelessly coupled to computing device 150 via personal area network 132 of FIG. 1.

Timeout module 208 may apply, with express user consent, the timeout value determined based on the usage profile generated by machine learning model 206. For example, timeout module 208 may store the timeout value as instructions for computing device 200 to activate the data transmission functionality of modem 212 after the timeout value elapses responsive to computing device 200 no longer being wirelessly coupled to a computing device or router that previously provided computing device 200 with data transmission functionality. Timeout module 208 may monitor the status of the data transmission functionality of computing device 200. Timeout module 208 may start a timer according to the timeout value responsive to computing device 200 no longer having data transmission functionality with a network. In response to timeout module 208 determining the timeout value has elapsed and computing device 200 has not restored any form of data transmission functionality, timeout module 208 may send instructions to modem 212 via communication channels 224. Timeout module 208 may send instruction to modem 212 to activate a data channel connection to a network (e.g., network 101 of FIG. 1). Timeout module 208 may send instructions to modem 212 to establish a data connection to a network.

Figure 3:
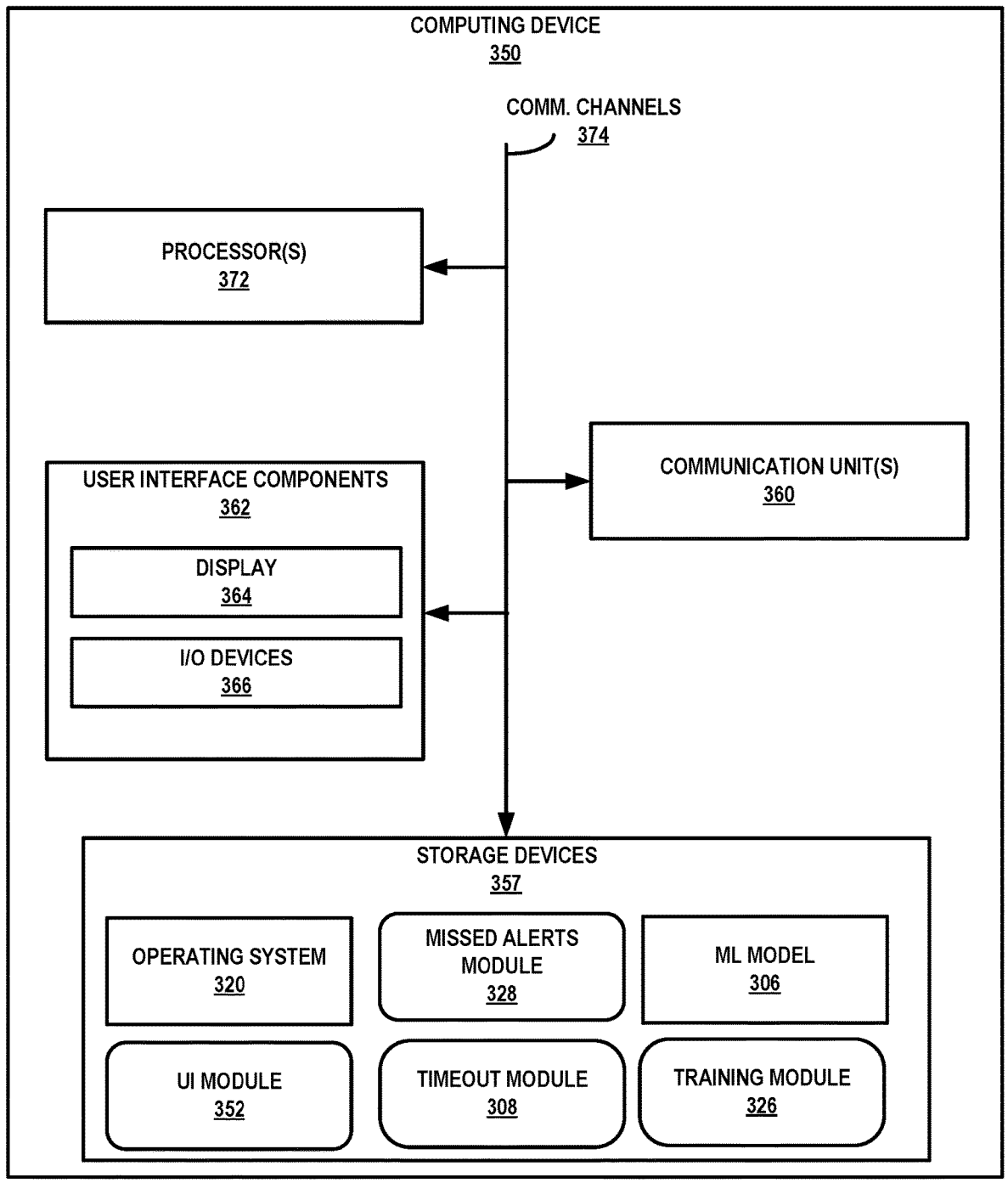
FIG. 3 is a block diagram illustrating another example computing device for determining when to activate a modem of a wearable computing device, in accordance with one or more aspects of the present disclosure.

FIG. 3 is a block diagram illustrating another example computing device 350 for determining when to activate a modem of a wearable computing device, in accordance with one or more aspects of the present disclosure. Computing device 350 may be one example of computing device 150 of FIG. 1, in accordance with one or more techniques of this disclosure. FIG. 3 illustrates only one particular example of computing device 350, and many examples of computing device 350 may be used in other instances and may include a subset of components included in example computing device 350 or may include additional components not shown in FIG. 3.

As shown in FIG. 3, computing device 350 may include one or more user interface components 362 ("UI components 362"), one or more processors 372 ("processor 372"), one or more storage devices 357 ("storage device 357"), and one or more communication units 360 ("communication unit 360"). Also shown in FIG. 2, UI components 362 may include display 364 and one or more input/output devices 366 ("I/O devices 366"). As also shown in FIG. 2, storage devices 207 may include a user interface module 352 ("UI module 352"), machine learning model 306 ("ML model 306"), timeout module 308, training module 326, missed alerts module 328, and operating system 320 ("OS 320").

In some examples, UI components 362 may include display 364 and input/output devices 366 ("I/O devices 366"). Display 364 may be a presence-sensitive display configured to detect input (e.g., touch and non-touch input) from a user of respective computing device 350. UI components 362 may output information to a user in the form of a UI, which may be associated with functionality provided by computing device 350. Such UIs may be associated with computing platforms, operating systems, applications, and/or services executing at or accessible from computing device 350 (e.g., electronic message applications, chat applications, Internet browser applications, mobile or desktop operating systems, social media applications, electronic games, menus, and other types of applications).

UI components 362 may include I/O devices 366. I/O devices 366 of computing device 350 may receive input. Examples of input are tactile, audio, and video input. I/O devices 366 of computing device 350, in one example, includes a presence-sensitive display, a fingerprint sensor, touch-sensitive screen, mouse, keyboard, voice responsive system, video camera, microphone or any other type of device for detecting input from a human or machine.

I/O devices 366 may include one or more sensors. Numerous examples of sensors exist and include any input component configured to obtain environmental information about the circumstances surrounding computing device 350 and/or physiological information that defines the activity state and/or physical well-being of a user of computing device 350. In some examples, a sensor may be an input component that obtains physical position, movement, and/or location information of computing device 350. For instance, sensors may include one or more location sensors (e.g., GNSS components, Wi-Fi components, cellular components), one or more temperature sensors, one or more motion sensors (e.g., multi-axial accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

I/O devices 366 of computing device 350 may generate one or more outputs. Examples of outputs are tactile, audio, and video output. I/O devices 366 of computing device 350, in one example, includes a presence-sensitive display, sound card, video graphics adapter card, speaker, liquid crystal display (LCD), or any other type of device for generating output to a human or machine.

Processors 372 may implement functionality and/or execute instructions within computing device 350. For example, processors 372 may receive and execute instructions that provide the functionality of missed alerts module 328, machine learning model 306, UI module 352, timeout module 308, training module 326, and OS 320. These instructions executed by processors 372 may cause computing device 350 to store and/or modify information within storage devices 357 or processors 372 during program execution. Processors 372 may execute instructions of missed alerts module 328, machine learning model 306, UI module 352, timeout module 308, training module 326, and OS 320 to perform one or more operations. That is, missed alerts module 328, machine learning model 306, UI module 352, timeout module 308, training module 326, and OS 320 may be operable by processors 372 to perform various functions described herein.

Storage devices 357 within computing device 350 may store information for processing during operation of computing device 350 (e.g., computing device 350 may store data accessed by missed alerts module 328, machine learning model 306, UI module 352, timeout module 308, training module 326, and OS 320 during execution at computing device 350). In some examples, storage devices 357 may include temporary memory, meaning that a primary purpose of storage devices 357 is not long-term storage. Storage devices 357 on computing device 350 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 357 may include one or more computer-readable storage media. Storage devices 357 may be configured to store larger amounts of information than volatile memory. Storage devices 357 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 357 may store program instructions and/or information associated with missed alerts module 328, machine learning model 306, UI module 352, timeout module 308, training module 326, and OS 320.

Communication units 360 of computing device 350 may communicate with one or more external devices via one or more wired and/or wireless networks by transmitting and/or receiving network signals on the one or more networks. Examples of communication units 360 may include a network interface card (e.g., such as an Ethernet card), an optical transceiver, a radio frequency transceiver, a GNSS receiver, or any other type of device that can send and/or receive information. Other examples of communication units 360 may include short wave radios, cellular data radios (for terrestrial and/or satellite cellular networks), wireless network radios, as well as universal serial bus (USB) controllers.

Communication channels 374 ("COMM channel 374") may interconnect each of the components 372, 360, 362, and 357 for inter-component communications (physically, communicatively, and/or operatively). In some examples, communication channel 374 may include a system bus, a network connection, an inter-process communication data structure, or any other method for communicating data.

Computing device 350 may include OS 320. OS 320 may control the operation of components of computing device 350. For example, OS 320 may facilitate the communication of missed alerts module 328, machine learning model 306, UI module 352, timeout module 308, and training module 326 with processors 372, storage devices 357, and communication units 360. In some examples, OS 320 may manage interactions between software applications and a user of computing device 350. OS 320 may have a kernel that facilitates interactions with underlying hardware of computing device 350 and provides a fully formed application space capable of executing a wide variety of software applications having secure partitions in which each of the software applications executes to perform various operations. In some examples, UI module 352 may be considered a component of OS 320.

In accordance with the techniques described herein, computing device 350 may obtain usage information associated with a wearable computing device (e.g., computing device 100 of FIG. 1). Computing device 350 may receive the usage information of the wearable computing device with communication units 360. Communication units 360 may provide the obtained usage information as an input to machine learning model 306. Machine learning model 306 may output a usage profile based on the obtained usage information. Machine learning model 306 may output a usage profile associated with behavior of a user operating computing device 350 and/or the wearable computing device where the usage information originated from. Machine learning model 306 may output the generated usage profile to timeout module 308.

Timeout module 308 may determine a timeout value based on the generated usage profile. Timeout module 308 may determine a timeout value associated with a length of time the wearable computing device may wait to automatically initialize data transmission functionality of a network interface device associated with the wearable computing device. Timeout module 308 may determine a timeout value defining a length of time the wearable computing device may wait to activate a data connection to a network in response to disconnecting from computing device 350. Timeout module 308 may use communication units 360 to output the timeout value, with instructions on how to apply the timeout value, to the wearable computing device.

In some examples, computing device 350 may be configured to relay incoming calls or messages to the wearable computing device (e.g., computing device 100 of FIG. 1) while computing device 350 is wirelessly connected to the wearable computing device (e.g., via personal area network 132 of FIG. 1). In such examples, the wearable computing device may not receive incoming calls or messages made to computing device 350 when the wearable computing device disconnects from computing device 350. Computing device 350, and more specifically missed alerts module 328, may send notifications to the wearable computing device with one or more indications of incoming voice calls or messages not received by the wearable computing device while the wearable computing device was disconnected from computing device 350. Missed alerts module 328 may generate a notification that includes all incoming calls or messages received by computing device 350 during the time the wearable computing device is disconnected from computing device 350. Missed alerts module 328 may generate a notification that includes all incoming calls or messages received by computing device 350 before the wearable computing device connects to a network (e.g., network 101 of FIG. 1). Missed alerts module 328 may generate a notification that includes all incoming calls or messages received by computing device 350 prior to the wearable computing device reconnecting to computing device 350.

Missed alerts module 328 may output the notification that includes all incoming calls or messages received by computing device 350 while the wearable computing device does not have data transmission functionality. Missed alerts module 328 may output the notification with communication units 360. Missed alerts module 328 may be configured to send the notification to the wearable computing device in response to the wearable computing device activating a network interface after the time specified in the timeout value has elapsed. Computing device 350 may also be configured to send the notification to the wearable computing device in response to the wearable computing device reconnecting with computing device 350 (e.g., via a personal area network). Computing device 350 may also be configured to send the notification to the wearable computing device in response to the wearable computing device being communicably coupled to computing device 350 (e.g., via a local area network).

Figure 4A:
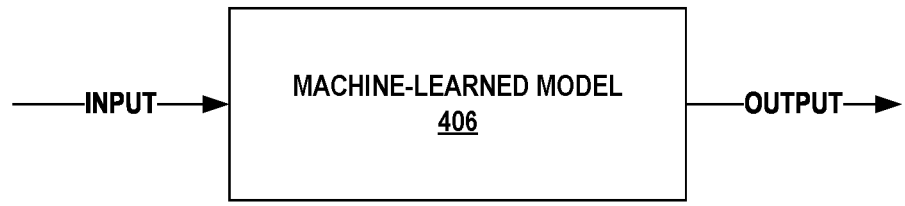
FIGS. 4A-4C are conceptual diagrams illustrating aspects of an example machine learning model trained to output a usage profile used for determining when to activate a modem of a wearable computing device, in accordance with one or more aspects of the present disclosure.
Figure 4B:
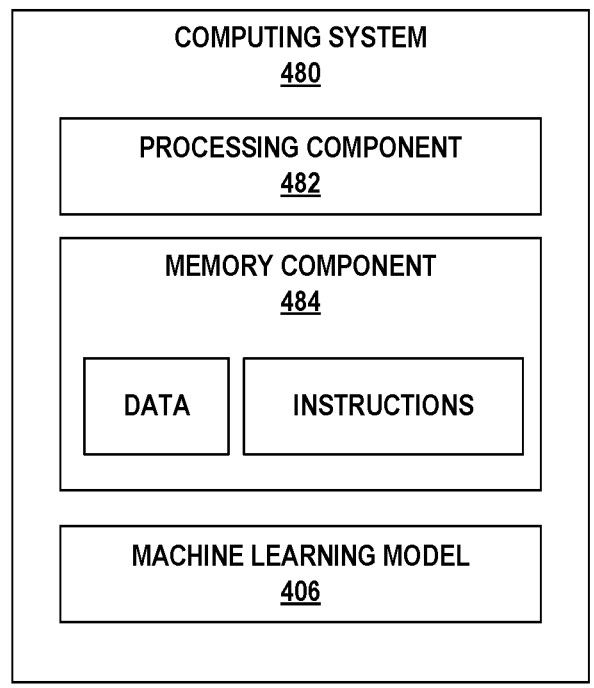
Figure 4C:
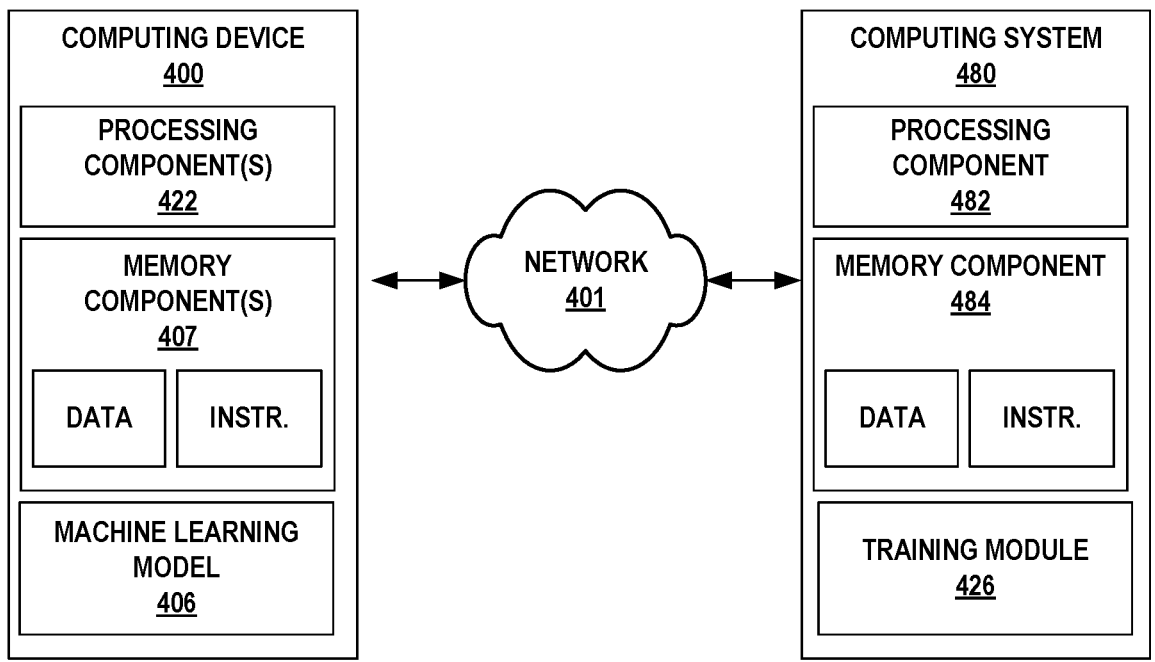

FIGS. 4A-4C are conceptual diagrams illustrating aspects of an example machine learning model trained to output a usage profile used for determining when to activate a modem of a wearable computing device, in accordance with one or more aspects of the present disclosure. FIGS. 4A-4C are described below in the context of machine learning model 106 of FIG. 1, machine learning model 206 of FIG. 2, and/or machine learning model 306 of FIG. 3. For example, in some instances, machine learning model 406, as referenced below, may be an example of machine learning model 106 of FIG. 1, machine learning model 206 of FIG. 2, and/or machine learning model 306 of FIG. 3.

FIG. 4A depicts a conceptual diagram of an example machine-learning model according to example implementations of the present disclosure. As illustrated in FIG. 4A, in some implementations, machine learning model 406 is trained to receive input data of one or more types, and in response, provide output data of one or more types. Thus, FIG. 4A illustrates machine learning model 406 performing inference. For example, machine learning model 406 may receive input data such as usage information associated with the behavior of a user of a computing device. Machine learning model 406 may, for example, output data based on the received input data. Machine learning model 406 may output data that includes one or more predictions associated with behavior of the user of the computing device. Machine learning model 406 may output predictions that may also be referred to as inferences. Machine learning model 406 may output predictions or inferences in the form of a usage profile.

Machine learning model 406 may be or include one or more various different types of machine learning models. In some implementations, machine learning model 406 may perform classification, regression, clustering, anomaly detection, recommendation generation, and/or other tasks. Machine learning model 406 may perform binary classification or multiclass classification. In binary classification, machine learning model 406 may output data that may include a classification of the input data into one of two different classes. For example, machine learning model 406 may receive input data of dates and times a user received or makes voice calls. Machine learning model 406 may classify the dates and times of the input data as the user either being available or unavailable. In some examples, machine learning model 406 may output data that includes a classification of the input data into one (or more) classes. In such examples, machine learning model 406 may output classification as a single label or multi-label. Machine learning model 406 may perform discrete categorical classification in which the input data is simply classified into one or more classes or categories. Machine learning model 406 may output the classifications as a user profile.

In some implementations, machine learning model 406 can perform classification in which machine learning model 406 provides, for each of one or more classes, a numerical value descriptive of a degree to which it is believed that the input data should be classified into the corresponding class. In some instances, the numerical values provided by machine learning model 406 can be referred to as "confidence scores" that are indicative of a respective confidence associated with classification of the input into the respective class. In some implementations, the confidence scores can be compared to one or more thresholds to render a discrete categorical prediction. In some implementations, only a certain number of classes (e.g., one) with the relatively largest confidence scores can be selected to render a discrete categorical prediction.

Machine learning model 406 may output a probabilistic classification. For example, machine learning model 406 may predict, given a sample input, a probability distribution over a set of classes. Thus, rather than outputting only the most likely class to which the sample input should belong, machine learning model 406 can output, for each class, a probability that the sample input belongs to such class. In some implementations, the probability distribution over all possible classes can sum to one. In some implementations, a Softmax function, or other type of function or layer can be used to squash a set of real values respectively associated with the possible classes to a set of real values in the range (0, 1) that sum to one.

In some examples, the probabilities provided by the probability distribution can be compared to one or more thresholds to render a discrete categorical prediction. In some implementations, only a certain number of classes (e.g., one) with the relatively largest predicted probability can be selected to render a discrete categorical prediction.

In cases in which machine learning model 406 performs classification, machine learning model 406 may be trained using supervised learning techniques. For example, machine learning model 406 may be trained on a training dataset that includes training examples labeled as belonging (or not belonging) to one or more classes. Further details regarding supervised training techniques are provided below in the descriptions of FIGS. 4B and 4C.

In some implementations, machine learning model 406 can perform regression to provide output data in the form of a continuous numeric value. The continuous numeric value can correspond to any number of different metrics or numeric representations, including, for example, currency values, scores, or other numeric representations. As examples, machine learning model 406 can perform linear regression, polynomial regression, or nonlinear regression. As examples, machine learning model 406 can perform simple regression or multiple regression. As described above, in some implementations, a Softmax function or other function or layer can be used to squash a set of real values respectively associated with two or more possible classes to a set of real values in the range (0, 1) that sum to one.

Machine learning model 406 may, in some cases, act as an agent within an environment. For example, machine learning model 406 can be trained using reinforcement learning, which will be discussed in further detail below.

In some implementations, machine learning model 406 can be a parametric model while, in other implementations, machine learning model 406 can be a non-parametric model. In some implementations, machine learning model 406 can be a linear model while, in other implementations, machine learning model 406 can be a non-linear model.

As described above, machine learning model 406 can be or include one or more of various different types of machine-learned models. Examples of such different types of machine-learned models are provided below for illustration. One or more of the example models described below can be used (e.g., combined) to provide the output data in response to the input data. Additional models beyond the example models provided below can be used as well.

In some implementations, machine learning model 406 can be or include one or more classifier models such as, for example, linear classification models; quadratic classification models; etc. Machine learning model 406 may be or include one or more regression models such as, for example, simple linear regression models; multiple linear regression models; logistic regression models; stepwise regression models; multivariate adaptive regression splines; locally estimated scatterplot smoothing models; etc.

In some implementations, machine learning model 406 can be or include one or more artificial neural networks (also referred to simply as neural networks). A neural network can include a group of connected nodes, which also can be referred to as neurons or perceptrons. A neural network can be organized into one or more layers. Neural networks that include multiple layers can be referred to as "deep" networks. A deep network can include an input layer, an output layer, and one or more hidden layers positioned between the input layer and the output layer. The nodes of the neural network can be connected or non-fully connected.

Machine learning model 406 can be or include one or more feed forward neural networks. In feed forward networks, the connections between nodes do not form a cycle. For example, each connection can connect a node from an earlier layer to a node from a later layer.

In some instances, machine learning model 406 can be or include one or more recurrent neural networks. In some instances, at least some of the nodes of a recurrent neural network can form a cycle. Recurrent neural networks can be especially useful for processing input data that is sequential in nature. In particular, in some instances, a recurrent neural network can pass or retain information from a previous portion of the input data sequence to a subsequent portion of the input data sequence through the use of recurrent or directed cyclical node connections.

In some examples, sequential input data can include time-series data (e.g., sensor data versus time or imagery captured at different times). For example, a recurrent neural network can analyze sensor data versus time to detect or predict a swipe direction, to perform handwriting recognition, etc. Sequential input data may include words in a sentence (e.g., for natural language processing, speech detection or processing, etc.); notes in a musical composition; sequential actions taken by a user (e.g., to detect or predict sequential application usage); sequential object states; etc.

Example recurrent neural networks include long short-term (LSTM) recurrent neural networks; gated recurrent units; bi-direction recurrent neural networks; continuous time recurrent neural networks; neural history compressors; echo state networks; Elman networks; Jordan networks; recursive neural networks; Hopfield networks; fully recurrent networks; sequence-to-sequence configurations; etc.

In some implementations, machine learning model 406 can be or include one or more convolutional neural networks. In some instances, a convolutional neural network can include one or more convolutional layers that perform convolutions over input data using learned filters.

Filters can also be referred to as kernels. Convolutional neural networks can be especially useful for vision problems such as when the input data includes imagery such as still images or video. However, convolutional neural networks can also be applied for natural language processing.

In some examples, machine learning model 406 can be or include one or more generative networks such as, for example, generative adversarial networks. Generative networks can be used to generate new data such as new images or other content.

Machine learning model 406 may be or include an autoencoder. In some instances, the aim of an autoencoder is to learn a representation (e.g., a lower-dimensional encoding) for a set of data, typically for the purpose of dimensionality reduction. For example, in some instances, an autoencoder can seek to encode the input data and then provide output data that reconstructs the input data from the encoding. Recently, the autoencoder concept has become more widely used for learning generative models of data. In some instances, the autoencoder can include additional losses beyond reconstructing the input data.

Machine learning model 406 may be or include one or more other forms of artificial neural networks such as, for example, deep Boltzmann machines; deep belief networks; stacked autoencoders; etc. Any of the neural networks described herein can be combined (e.g., stacked) to form more complex networks.

One or more neural networks can be used to provide an embedding based on the input data. For example, the embedding can be a representation of knowledge abstracted from the input data into one or more learned dimensions. In some instances, embeddings can be a useful source for identifying related entities. In some instances, embeddings can be extracted from the output of the network, while in other instances embeddings can be extracted from any hidden node or layer of the network (e.g., a close to final but not final layer of the network). Embeddings can be useful for performing auto suggest next video, product suggestion, entity or object recognition, etc. In some instances, embeddings are useful inputs for downstream models. For example, embeddings can be useful to generalize input data (e.g., search queries) for a downstream model or processing system.

In some implementations, machine learning model 406 can perform one or more dimensionality reduction techniques such as, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, machine learning model 406 can perform or be subjected to one or more reinforcement learning techniques such as Markov decision processes; dynamic programming; Q functions or Q-learning; value function approaches; deep Q-networks; differentiable neural computers; asynchronous advantage actor-critics; deterministic policy gradient; etc.

In some implementations, machine learning model 406 can be an autoregressive model. In some instances, an autoregressive model can specify that the output data depends linearly on its own previous values and on a stochastic term. In some instances, an autoregressive model can take the form of a stochastic difference equation. One example of an autoregressive model is WaveNet, which is a generative model for raw audio.

In some implementations, machine learning model 406 can include or form part of a multiple model ensemble. As one example, bootstrap aggregating can be performed, which can also be referred to as "bagging." In bootstrap aggregating, a training dataset is split into a number of subsets (e.g., through random sampling with replacement) and a plurality of models are respectively trained on the number of subsets. At inference time, respective outputs of the plurality of models can be combined (e.g., through averaging, voting, or other techniques) and used as the output of the ensemble.

One example ensemble is a random forest, which can also be referred to as a random decision forest. Random forests are an ensemble learning method for classification, regression, and other tasks. Random forests are generated by producing a plurality of decision trees at training time. In some instances, at inference time, the class that is the mode of the classes (classification) or the mean prediction (regression) of the individual trees can be used as the output of the forest. Random decision forests can correct for decision trees' tendency to overfit their training set.

Another example ensemble technique is stacking, which can, in some instances, be referred to as stacked generalization. Stacking includes training a combiner model to blend or otherwise combine the predictions of several other machine-learned models. Thus, a plurality of machine-learned models (e.g., of same or different type) can be trained based on training data. In addition, a combiner model can be trained to take the predictions from the other machine-learned models as inputs and, in response, produce a final inference or prediction. In some instances, a single-layer logistic regression model can be used as the combiner model.

Another example of an ensemble technique is boosting. Boosting can include incrementally building an ensemble by iteratively training weak models and then adding to a final strong model. For example, in some instances, each new model can be trained to emphasize the training examples that previous models misinterpreted (e.g., misclassified). For example, a weight associated with each of such misinterpreted examples can be increased. One common implementation of boosting is AdaBoost, which can also be referred to as Adaptive Boosting. Other example boosting techniques include LPBoost; TotalBoost; BrownBoost; xgboost; MadaBoost, LogitBoost, gradient boosting; etc. Furthermore, any of the models described above (e.g., regression models and artificial neural networks) can be combined to form an ensemble. As an example, an ensemble can include a top level machine-learned model or a heuristic function to combine and/or weight the outputs of the models that form the ensemble.

In some implementations, multiple machine-learned models (e.g., that form an ensemble can be linked and trained jointly (e.g., through backpropagation of errors sequentially through the model ensemble). However, in some implementations, only a subset (e.g., one) of the jointly trained models is used for inference.

In some implementations, machine learning model 406 can be used to preprocess the input data for subsequent input into another model. For example, machine learning model 406 can perform dimensionality reduction techniques and embeddings (e.g., matrix factorization, principal components analysis, singular value decomposition, word2vec/GLOVE, and/or related approaches); clustering; and even classification and regression for downstream consumption. Many of these techniques have been discussed above and will be further discussed below.

As discussed above, machine learning model 406 can be trained or otherwise configured to receive the input data and, in response, provide the output data. The input data can include different types, forms, or variations of input data. As examples, in various implementations, the input data can include features that describe the content (or portion of content) initially selected by the user, e.g., content of user-selected document or image, links pointing to the user selection, links within the user selection relating to other files available on device or cloud, metadata of user selection, etc. Additionally, with user permission, the input data includes the context of user usage, either obtained from the app itself or from other sources. Examples of usage context include breadth of share (sharing publicly, or with a large group, or privately, or a specific person), context of share, etc. When permitted by the user, additional input data can include the state of the device, e.g., the location of the device, the apps running on the device, etc.

Additionally, with user permission, the input data includes the context of user usage, either obtained from the app itself or from other sources. Examples of usage context include breadth of share (sharing publicly, or with a large group, or privately, or a specific person), context of share, etc. When permitted by the user, additional input data can include the state of the device, e.g., the location of the device, the apps running on the device, etc.

In some implementations, machine learning model 406 can receive and use the input data in its raw form. In some implementations, the raw input data can be preprocessed. Thus, in addition or alternatively to the raw input data, machine learning model 406 can receive and use the preprocessed input data.

In some implementations, preprocessing the input data can include extracting one or more additional features from the raw input data. For example, feature extraction techniques can be applied to the input data to generate one or more new, additional features. Example feature extraction techniques include edge detection; corner detection; blob detection; ridge detection; scale-invariant feature transform; motion detection; optical flow; Hough transform; etc.

In some implementations, the extracted features can include or be derived from transformations of the input data into other domains and/or dimensions. As an example, the extracted features can include or be derived from transformations of the input data into the frequency domain. For example, wavelet transformations and/or fast Fourier transforms can be performed on the input data to generate additional features.

In some implementations, the extracted features can include statistics calculated from the input data or certain portions or dimensions of the input data. Example statistics include the mode, mean, maximum, minimum, or other metrics of the input data or portions thereof.

In some implementations, as described above, the input data can be sequential in nature. In some instances, the sequential input data can be generated by sampling or otherwise segmenting a stream of input data. As one example, frames can be extracted from a video. In some implementations, sequential data can be made non-sequential through summarization.

As another example of a preprocessing technique, portions of the input data can be imputed. For example, additional synthetic input data can be generated through interpolation and/or extrapolation.

As another example of a preprocessing technique, some or all of the input data can be scaled, standardized, normalized, generalized, and/or regularized. Example regularization techniques include ridge regression; least absolute shrinkage and selection operator (LASSO); elastic net; least-angle regression; cross-validation; L1 regularization; L2 regularization; etc. As one example, some or all of the input data can be normalized by subtracting the mean across a given dimension's feature values from each individual feature value and then dividing by the standard deviation or other metric.

As another example of a preprocessing technique, some or all or the input data can be quantized or discretized. In some cases, qualitative features or variables included in the input data can be converted to quantitative features or variables. For example, one hot encoding can be performed.

In some examples, dimensionality reduction techniques can be applied to the input data prior to input into machine learning model 406. Several examples of dimensionality reduction techniques are provided above, including, for example, principal component analysis; kernel principal component analysis; graph-based kernel principal component analysis; principal component regression; partial least squares regression; Sammon mapping; multidimensional scaling; projection pursuit; linear discriminant analysis; mixture discriminant analysis; quadratic discriminant analysis; generalized discriminant analysis; flexible discriminant analysis; autoencoding; etc.

In some implementations, during training, the input data can be intentionally deformed in any number of ways to increase model robustness, generalization, or other qualities. Example techniques to deform the input data include adding noise; changing color. shade, or hue; magnification; segmentation; amplification; etc.

In response to receipt of the input data, machine learning model 406 can provide the output data. The output data can include different types, forms, or variations of output data. As examples, in various implementations, the output data can include content, either stored locally on the user device or in the cloud, that is relevantly shareable along with the initial content selection.

As discussed above, in some implementations, the output data can include various types of classification data (e.g., binary classification, multiclass classification, single label, multi-label, discrete classification, regressive classification, probabilistic classification, etc.) or can include various types of regressive data (e.g., linear regression, polynomial regression, nonlinear regression, simple regression, multiple regression, etc.). In other instances, the output data can include clustering data, anomaly detection data, recommendation data, or any of the other forms of output data discussed above.

In some implementations, the output data can influence downstream processes or decision making. As one example, in some implementations, the output data can be interpreted and/or acted upon by a rules-based regulator.

The present disclosure provides systems and methods that include or otherwise leverage one or more machine-learned models to suggest content, either stored locally on the user's device or in the cloud, that is relevantly shareable along with the initial content selection based on features of the initial content selection. Any of the different types or forms of input data described above can be combined with any of the different types or forms of machine-learned models described above to provide any of the different types or forms of output data described above.

The systems and methods of the present disclosure can be implemented by or otherwise executed on one or more computing devices. Example computing devices include user computing devices (e.g., laptops, desktops, and mobile computing devices such as tablets, smartphones, wearable computing devices, etc.); embedded computing devices (e.g., devices embedded within a vehicle, camera, image sensor, industrial machine, satellite, gaming console or controller, or home appliance such as a refrigerator, thermostat, energy meter, home energy manager, smart home assistant, etc.); other computing devices; or combinations thereof.

FIG. 4B illustrates a conceptual diagram of computing system 480. Computing system 480 includes processing component 482, memory component 484 and machine learning model 406. Computing system 480 may store and implement machine learning model 406 locally (i.e., on-device). Thus, machine learning model 406 can be stored at and/or implemented locally by an embedded device or a user computing device such as a mobile device. Output data obtained through local implementation of machine learning model 406 at the embedded device or the user computing device can be used to improve performance of the embedded device or the user computing device (e.g., an application implemented by the embedded device or the user computing device).

FIG. 4C illustrates a conceptual diagram of an example computing device 400 in communication with an example computing system 480 that includes training module 426. FIG. 4C includes computing device 400 communicating with computing system 480 over network 401. Computing device 400 may be an example of computing device 100 of FIG. 1. Machine learning model 406 described herein can be trained at computing system 480, and then provided for storage and/or implementation at one or more computing devices, such as computing device 400. For example, training module 426 executes locally at computing system 480. In some examples, training module 426 may be included in or separate from computing device 400 or any other computing device that implements machine learning model 406.

Computing device 400 that implements machine learning model 406 or other aspects of the present disclosure and computing system 480 that trains machine learning model 406 can include a number of hardware components that enable performance of the techniques described herein. For example, computing device 400 can include one or more memory components 407 that store some or all of machine learning model 406. For example, machine learning model 406 can be a structured numerical representation that is stored in memory components 407. Memory components 407 may also include instructions for implementing machine learning model 406 or performing other operations. Example memory components 407 include RAM, ROM, EEPROM, EPROM, flash memory devices, magnetic disks, etc., and combinations thereof.

Computing device 400 can also include one or more processing components 422 that implement some or all of machine learning model 406 and/or perform other related operations. Example processing components 422 include one or more of: a central processing unit (CPU); a visual processing unit (VPU); a graphics processing unit (GPU); a tensor processing unit (TPU); a neural processing unit (NPU); a neural processing engine; a core of a CPU, VPU, GPU, TPU, NPU or other processing device; an application specific integrated circuit (ASIC); a field programmable gate array (FPGA); a co-processor; a controller; or combinations of the processing devices described above. Processing components 407 may be embedded within other hardware components such as, for example, an image sensor, accelerometer, etc.

Computing system 480 may perform graph processing techniques or other machine learning techniques using one or more machine learning platforms, frameworks, and/or libraries, such as, for example, TensorFlow, Caffe/Caffe2, Theano, Torch/PyTorch, MXnet, CNTK, etc. In some implementations, machine learning model 406 may be trained in an offline fashion or an online fashion. In offline training (also known as batch learning), machine learning model 406 is trained on the entirety of a static set of training data. In online learning, machine learning model 406 is continuously trained (or re-trained) as new training data becomes available (e.g., while the model is used to perform inference).

Training module 426 may perform centralized training of machine learning model 406 (e.g., based on a centrally stored dataset). In other implementations, decentralized training techniques such as distributed training, federated learning, or the like can be used to train, update, or personalize machine learning model 406.

Machine learning model 406 described herein can be trained according to one or more of various different training types or techniques. For example, in some implementations, machine learning model 406 can be trained by training module 426 using supervised learning, in which machine learning model 406 is trained on a training dataset that includes instances or examples that have labels. The labels can be manually applied by experts, generated through crowd-sourcing, or provided by other techniques (e.g., by physics-based or complex mathematical models). In some implementations, if the user has provided consent, the training examples can be provided by the computing device 400. In some implementations, this process can be referred to as personalizing the model.

Once training module 426 of computing system 480 has finished training machine learning model 406, machine learning model 406 may be installed onto computing device 400. For example, computing system 480 may transfer machine learning model 406 to computing device 400 via network 401, or machine learning model 406 may be installed in computing device 400 during manufacturing of computing device 400. In some examples, once machine learning model 406 has been trained at computing system 480, computing system 480 may perform post-training weight quantization, such as by using TensorFlow Lite libraries, to compress model weights, such as by compressing model weights into 8-bit integers, to enable computing device 400 to perform more efficient on-device inference using machine learning model 406.

Figure 5:
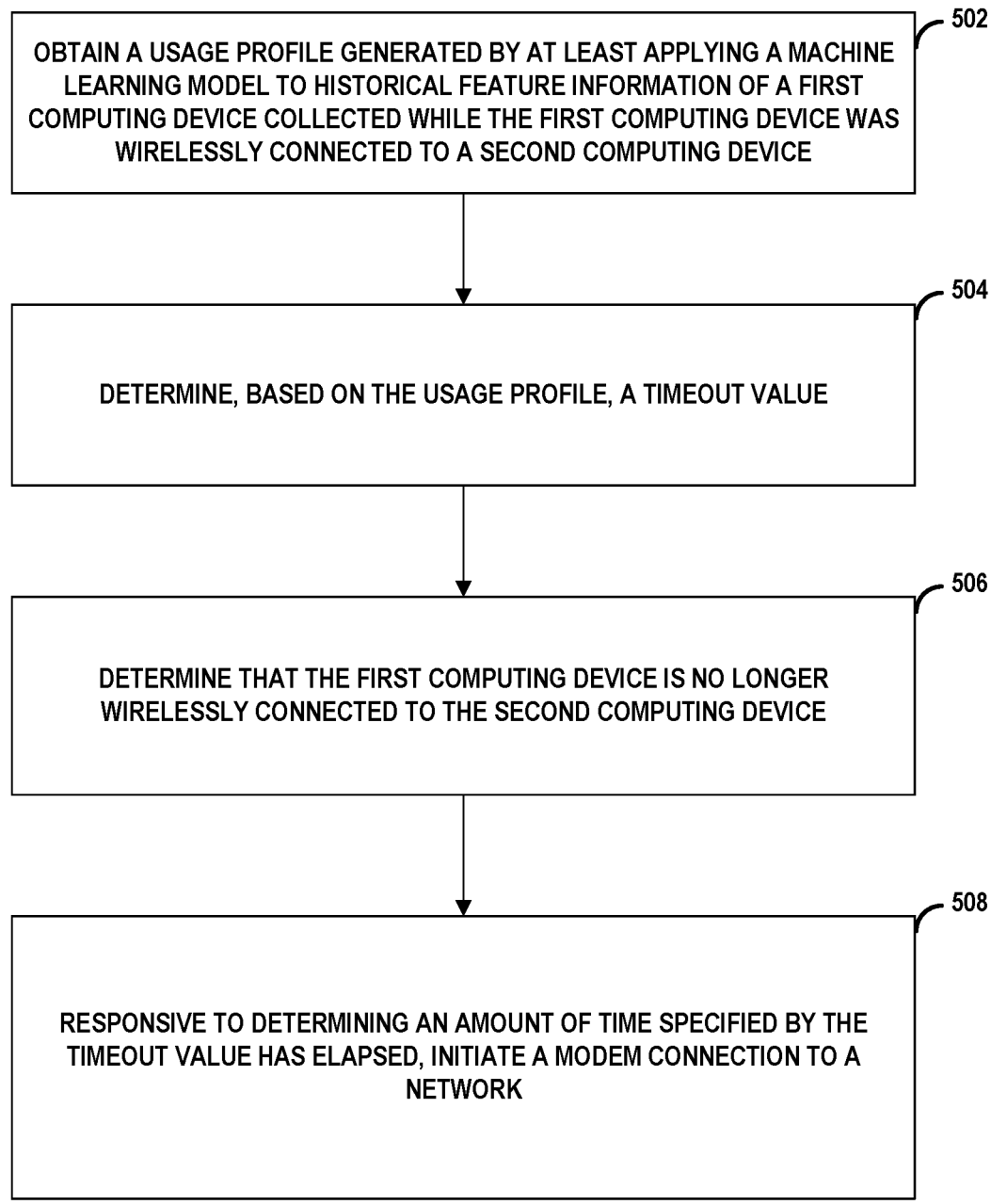
FIG. 5 is a flowchart illustrating an example process for determining when to activate a modem of a wearable computing device, in accordance with one or more aspects of the present disclosure.

FIG. 5 is a flowchart illustrating an example process for determining when to activate a modem of a wearable computing device, in accordance with one or more aspects of the present disclosure. For purposes of illustration only, the example operations are described below within the context of FIG. 1.

As shown in FIG. 5, computing device 100 may obtain a usage profile generated by at least applying machine learning model 106 to historical feature information of computing device 100 (502). Computing device 100 may obtain a usage profile generated by at least applying machine learning model 106 to historical feature information of computing device 100 while computing device 100 was wirelessly connected to computing device 150 (e.g., via personal area network 132). Usage monitor 104, after receiving explicit user consent, may collect historical feature usage information of computing device 100 while computing device 100 was wireless connected to computing device 150. In some examples, computing device 100 may send the historical feature information to machine learning model 106, where machine learning model 106 is hosted by computing device 150 or an external computing system. Machine learning model 106 may generate the usage profile and send the usage profile to timeout module 108.

Timeout module 108 may determine a timeout value based on the obtained usage profile (504). Timeout module 108 may determine a timeout value associated with a length of time that will elapse prior to modem 112 initiating a data connection to network 101 and after computing device 100 disconnects from computing device 150. Timeout module 108 may determine that computing device 100 is no longer wirelessly connected to computing device 150 (506). Timeout module 108 may start a timer associated with the timeout module responsive to determining computing device 100 is no longer wirelessly connected to computing device 150. Responsive to determining an amount of time specified by the timeout value has elapsed, computing device 100 may initiate a modem 112 connection to network 101 (508).

Example 1: A method includes obtaining, by a first computing device, a usage profile generated by at least applying a machine learning model to historical feature usage information of the first computing device collected while the first computing device was wirelessly connected to a second computing device; determining, by the first computing device and based on the usage profile, a timeout value; and responsive to determining, by the first computing device, that the first computing device is no longer wirelessly connected to the second computing device and after an amount of time specified by the timeout value has elapsed, initiating, by the first computing device, a modem connection to a network.

Example 2: The method of example 1, wherein the historical feature usage information includes at least one of: a frequency at which the first computing device or the second computing device sends and receives signals to establish one or more audio calls, availability of a user of the first computing device based on a schedule of the user, or a signal strength indication of the first computing device at a particular time of day, wherein the signal strength indication comprises a signal strength of a wireless connection between the first computing device and the second computing device.

Example 3: The method of any of examples 1 and 2, wherein the first computing device is wirelessly connected to the second computing device via a personal area network.

Example 4: The method of any of examples 1 through 3, wherein generating the usage profile by at least applying the machine learning model to historical feature usage information of the first computing device collected while the first computing device was wirelessly connected to the second computing device further comprises: continuously updating the usage profile by providing the machine learning model additional historical feature usage information of the first computing device.

Example 5: The method of any of examples 1 through 4, further includes sending, by the first computing device and to a remote computing system, the historical feature usage information, wherein the remote computing system is one of the second computing device or a different computing system; obtaining, by the first computing device, the usage profile, wherein the usage profile is generated by the remote computing system; and receiving, by the first computing device and from the remote computing system, instructions for updating the timeout value.

Example 6: The method of any of examples 1 through 5, further includes receiving, by the first computing device and from the second computing device, a notification in response to the first computing device initiating the modem connection to the network based on the amount of time specified by the timeout value or reconnecting to the second computing device after the first computing device is disconnected from the second computing device.

Example 7: The method of example 6, wherein the notification includes one or more indications of an incoming voice call or a message not received by the first computing device while the first computing device was disconnected from the second computing device.

Example 8: The method of any of examples 1 through 7, wherein a service supporting a voice channel modem connection to the network allows calling over a wireless local area network, and wherein the first computing device updates the timeout value to an indefinite length of time in response the wireless local area network establishing the voice channel modem connection to the network.

Example 9: The method of any of examples 1 through 8, wherein the first computing device provides the machine learning model one or more instances of a user of the first computing device activating the modem connection to the network prior to the first computing device activating the modem connection to the network based on the amount of time specified by the timeout value, and wherein the machine learning model updates the usage profile based on the one or more instances.

Example 10: A computing device includes at least one processor; a network interface; and a storage device that stores instructions executable by the at least one processor to: obtain a usage profile generated by at least applying a machine learning model to historical feature usage information of the computing device collected while the computing device was wirelessly connected to a companion computing device; determine, based on the usage profile, a timeout value; and responsive to determining that the computing device is no longer wirelessly connected to the companion computing device and after an amount of time specified by the timeout value has elapsed, initiate a connection to a network using the network interface.

Example 11: The computing device of example 10, wherein the historical feature usage information includes at least one of: a frequency at which the computing device or the companion computing device sends and receives signals to establish one or more audio calls, availability of a user of the computing device based on a schedule of the user, or a signal strength indication of the computing device at a particular time of day, and wherein the signal strength indication comprises a signal strength of a wireless connection between the computing device and the companion computing device.

Example 12: The computing device of any of examples 10 and 11, wherein the computing device is wirelessly connected to the companion computing device via a personal area network.

Example 13: The computing device of any of examples 10 through 12, wherein the instructions executable by the at least one processor further cause the at least one processor to: send, to a remote computing system, the historical feature usage information, wherein the remote computing system is one of the companion computing device or a computing system; obtain, the usage profile, wherein the usage profile is generated by the remote computing system; and receive, from the remote computing system, instructions for updating the timeout value.

Example 14: The computing device of any of examples 10 through 13, wherein: the instructions further cause the at least one processor to receive, from the companion computing device, a notification in response to the computing device initiating the connection to the network based on the amount of time specified by the timeout value or reconnecting to the companion computing device after the computing device is disconnected from the companion computing device.

Example 15: The computing device of example 14, wherein the notification includes one or more indications of an incoming voice call or a message not received by the computing device while the computing device was disconnected from the companion computing device.

Example 16: A computer-readable storage medium storing instructions that, when executed, cause at least one processor of a first computing device to: obtain a usage profile generated by at least applying a machine learning model to historical feature usage information of the first computing device collected while the first computing device was wirelessly connected to a second computing device; determine, based on the usage profile, a timeout value; and responsive to determining that the first computing device is no longer wirelessly connected to the second computing device and after an amount of time specified by the timeout value has elapsed, initiate a modem connection to a network.

Example 17: The computer-readable storage medium of example 16, wherein the historical feature usage information includes at least one of: a frequency at which the first computing device or the second computing device sends and receives signals to establish one or more audio calls, availability of a user of the first computing device based on a schedule of the user, or a signal strength indication of the first computing device at a particular time of day, wherein the signal strength indication comprises a signal strength of a wireless connection between the first computing device and the second computing device.

Example 18: The computer-readable storage medium of any of examples 16 and 17, wherein the first computing device is wirelessly connected to the second computing device via a personal area network.

Example 19: The computer-readable storage medium of any of examples 16 through 18, wherein the instructions further cause the at least one processor to: send, to a remote computing system, the historical feature usage information, wherein the remote computing system is one of the second computing device or a computing system; obtain, the usage profile, wherein the usage profile is generated by the remote computing system; and receive, from the remote computing system, instructions for updating the timeout value.

Example 20: The computer-readable storage medium of any of examples 16 through 19, wherein the instructions further cause the at least one processor to: receive, from the second computing device, a notification in response to the first computing device initiating the modem connection to the network based on the amount of time specified by the timeout value or reconnecting to the second computing device after the first computing device is disconnected from the second computing device.

Example 21: A computing system comprising means for performing any of the methods of example 1-9.

Example 22: A computing device comprising means for performing any of the methods of example 1-9.

Example 23: A computer-readable storage medium encoded with instructions that cause one or more processors to perform any of the methods of examples 1-9.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of a computer-readable medium.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various examples of the invention have been described. These and other examples are within the scope of the following claims.

What is claimed is:

1. A method comprising:
   obtaining, by a first computing device, a usage profile generated by at least applying a machine learning model to historical feature usage information of the first computing device collected while the first computing device was wirelessly connected to a second computing device;
   determining, by the first computing device and based on the usage profile, a timeout value; and
   responsive to determining, by the first computing device, that the first computing device is no longer wirelessly connected to the second computing device and after an amount of time specified by the timeout value has elapsed, initiating, by the first computing device, a modem connection to a network.

2. The method of claim 1, wherein the historical feature usage information includes at least one of: a frequency at which the first computing device or the second computing device sends and receives signals to establish one or more audio calls, availability of a user of the first computing device based on a schedule of the user, or a signal strength indication of the first computing device at a particular time of day, wherein the signal strength indication comprises a signal strength of a wireless connection between the first computing device and the second computing device.

3. The method of claim 1, wherein the first computing device is wirelessly connected to the second computing device via a personal area network.

4. The method of claim 1, wherein generating the usage profile by at least applying the machine learning model to historical feature usage information of the first computing device collected while the first computing device was wirelessly connected to the second computing device further comprises:
   continuously updating the usage profile by providing the machine learning model additional historical feature usage information of the first computing device.

5. The method of claim 1, further comprising:
   sending, by the first computing device and to a remote computing system, the historical feature usage information, wherein the remote computing system is one of the second computing device or a different computing system;
   obtaining, by the first computing device, the usage profile, wherein the usage profile is generated by the remote computing system; and
   receiving, by the first computing device and from the remote computing system, instructions for updating the timeout value.

6. The method of claim 1, further comprising:
   receiving, by the first computing device and from the second computing device, a notification in response to the first computing device initiating the modem connection to the network based on the amount of time specified by the timeout value or reconnecting to the second computing device after the first computing device is disconnected from the second computing device.

7. The method of claim 6, wherein the notification includes one or more indications of an incoming voice call or a message not received by the first computing device while the first computing device was disconnected from the second computing device.

8. The method of claim 1, wherein a service supporting a voice channel modem connection to the network allows calling over a wireless local area network, and wherein the first computing device updates the timeout value to an indefinite length of time in response the wireless local area network establishing the voice channel modem connection to the network.

9. The method of claim 1, wherein the first computing device provides the machine learning model one or more instances of a user of the first computing device activating the modem connection to the network prior to the first computing device activating the modem connection to the network based on the amount of time specified by the timeout value, and wherein the machine learning model updates the usage profile based on the one or more instances.

10. A computing device comprising:
    at least one processor;
    a network interface; and
    a storage device that stores instructions executable by the at least one processor to:
      obtain a usage profile generated by at least applying a machine learning model to historical feature usage information of the computing device collected while the computing device was wirelessly connected to a companion computing device;
      determine, based on the usage profile, a timeout value; and
      responsive to determining that the computing device is no longer wirelessly connected to the companion computing device and after an amount of time specified by the timeout value has elapsed, initiate a connection to a network using the network interface.

11. The computing device of claim 10, wherein the historical feature usage information includes at least one of: a frequency at which the computing device or the companion computing device sends and receives signals to establish one or more audio calls, availability of a user of the computing device based on a schedule of the user, or a signal strength indication of the computing device at a particular time of day, and wherein the signal strength indication comprises a signal strength of a wireless connection between the computing device and the companion computing device.

12. The computing device of claim 10, wherein the computing device is wirelessly connected to the companion computing device via a personal area network.

13. The computing device of claim 10, wherein the instructions executable by the at least one processor further cause the at least one processor to:
   send, to a remote computing system, the historical feature usage information, wherein the remote computing system is one of the companion computing device or a computing system;
   obtain, the usage profile, wherein the usage profile is generated by the remote computing system; and
   receive, from the remote computing system, instructions for updating the timeout value.

14. The computing device of claim 10, wherein:
   the instructions further cause the at least one processor to receive, from the companion computing device, a notification in response to the computing device initiating the connection to the network based on the amount of time specified by the timeout value or reconnecting to the companion computing device after the computing device is disconnected from the companion computing device.

15. The computing device of claim 14, wherein the notification includes one or more indications of an incoming voice call or a message not received by the computing device while the computing device was disconnected from the companion computing device.

16. A computer-readable storage medium storing instructions that, when executed, cause at least one processor of a first computing device to:
   obtain a usage profile generated by at least applying a machine learning model to historical feature usage information of the first computing device collected while the first computing device was wirelessly connected to a second computing device;
   determine, based on the usage profile, a timeout value; and
   responsive to determining that the first computing device is no longer wirelessly connected to the second computing device and after an amount of time specified by the timeout value has elapsed, initiate a modem connection to a network.

17. The computer-readable storage medium of claim 16, wherein the historical feature usage information includes at least one of: a frequency at which the first computing device or the second computing device sends and receives signals to establish one or more audio calls, availability of a user of the first computing device based on a schedule of the user, or a signal strength indication of the first computing device at a particular time of day, wherein the signal strength indication comprises a signal strength of a wireless connection between the first computing device and the second computing device.

18. The computer-readable storage medium of claim 16, wherein the first computing device is wirelessly connected to the second computing device via a personal area network.

19. The computer-readable storage medium of claim 16, wherein the instructions further cause the at least one processor to:
   send, to a remote computing system, the historical feature usage information, wherein the remote computing system is one of the second computing device or a computing system;
   obtain, the usage profile, wherein the usage profile is generated by the remote computing system; and
   receive, from the remote computing system, instructions for updating the timeout value.

20. The computer-readable storage medium of claim 16, wherein the instructions further cause the at least one processor to:
   receive, from the second computing device, a notification in response to the first computing device initiating the modem connection to the network based on the amount of time specified by the timeout value or reconnecting to the second computing device after the first computing device is disconnected from the second computing device.

* * * * *